(12) United States Patent
Manahan

(10) Patent No.: US 8,777,535 B2
(45) Date of Patent: Jul. 15, 2014

(54) FASTENING DEVICES FOR EXPLOSION-PROOF ENCLOSURES

(71) Applicant: Joseph Michael Manahan, Manlius, NY (US)

(72) Inventor: Joseph Michael Manahan, Manlius, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/793,774

(22) Filed: Mar. 11, 2013

(65) Prior Publication Data

US 2013/0294862 A1   Nov. 7, 2013

Related U.S. Application Data

(60) Provisional application No. 61/640,827, filed on May 1, 2012.

(51) Int. Cl.
*F16B 39/00* (2006.01)

(52) U.S. Cl.
USPC .................. 411/166; 411/107; 411/366.1

(58) Field of Classification Search
USPC ............ 411/107, 166, 353, 366.1, 379, 383; 292/251
See application file for complete search history.

(56) References Cited

U.S. PATENT DOCUMENTS

| | | | |
|---|---|---|---|
| 1,482,049 A | 1/1924 | Swanson | |
| 1,836,949 A * | 12/1931 | Balough | 411/366.1 |
| 2,360,826 A * | 10/1944 | Cherry | 411/166 |
| 3,360,155 A | 12/1967 | Colonna | |
| 3,416,823 A * | 12/1968 | Auer | 403/408.1 |
| 3,901,122 A | 8/1975 | Novotny | |
| 3,910,155 A | 10/1975 | Wilson | |
| 3,974,933 A | 8/1976 | Toth et al. | |
| 4,059,199 A * | 11/1977 | Quaney | 220/3.8 |
| 4,139,118 A | 2/1979 | Parker | |
| 4,157,146 A | 6/1979 | Svenson | |
| 4,233,697 A * | 11/1980 | Cornwall | 4/252.4 |
| 4,656,793 A | 4/1987 | Fons | |
| 4,664,281 A | 5/1987 | Falk et al. | |
| 4,902,046 A * | 2/1990 | Maloberti | 285/34 |
| 5,004,129 A | 4/1991 | Loch et al. | |
| 5,322,178 A | 6/1994 | Foos | |
| 5,346,090 A * | 9/1994 | Purohit et al. | 220/23.87 |
| 5,399,052 A | 3/1995 | Volkmann et al. | |
| 5,657,892 A | 8/1997 | Bolli et al. | |

(Continued)

FOREIGN PATENT DOCUMENTS

| | | |
|---|---|---|
| EP | 0346290 | 12/1989 |
| EP | 1970604 | 9/2008 |

(Continued)

*Primary Examiner* — Roberta Delisle
(74) *Attorney, Agent, or Firm* — King & Spalding LLP

(57) ABSTRACT

A system for fastening a cover to a body of an explosion-proof enclosure using a plurality of fastening devices. Each fastening device can include a first load distributing member disposed on a body flange of a body of the explosion-proof enclosure. Each fastening device can also include a second load distributing member disposed on a cover flange of a cover of the explosion-proof enclosure. Each fastening device can further include a fastener positioned atop the first load distributing member, where the fastener traverses the first load distributing member, the cover flange, and the body flange. Each fastening device can also include a fastener receiver positioned under the second load distributing member and mechanically coupled to the fastener.

22 Claims, 3 Drawing Sheets

(56) References Cited

U.S. PATENT DOCUMENTS

| | | | |
|---|---|---|---|
| 5,785,449 A * | 7/1998 | DiBene | 403/343 |
| 5,888,140 A * | 3/1999 | Klingler et al. | 464/99 |
| 6,769,850 B2 | 8/2004 | Lay | |
| 6,938,385 B2 * | 9/2005 | Lind | 52/204.7 |
| 7,877,948 B2 * | 2/2011 | Davies | 52/506.05 |
| 2011/0131898 A1 * | 6/2011 | Nies et al. | 52/173.1 |
| 2012/0160052 A1 | 6/2012 | Manahan et al. | |

FOREIGN PATENT DOCUMENTS

| | | |
|---|---|---|
| JP | 08026314 | 1/1996 |
| JP | 08-233108 | 9/1996 |
| JP | 0932923 | 2/1997 |
| JP | 10-101108 | 4/1998 |
| JP | 2008105746 | 5/2008 |
| JP | 4847646 | 10/2011 |
| WO | 2011084152 | 7/2011 |

* cited by examiner

FASTENING DEVICES FOR EXPLOSION-PROOF ENCLOSURES

CROSS-REFERENCE TO RELATED APPLICATIONS

This application claims priority under 35 U.S.C. §119 to U.S. Provisional Patent Application Ser. No. 61/640,827, titled "Fastening Devices for Explosion-Proof Enclosures" and filed on May 1, 2012, the entire contents of which are hereby incorporated herein by reference.

The present application is further related to U.S. patent application Ser. No. 13/793,672, titled "Fastening Devices for Explosion-Proof Enclosures," which is being filed concurrently with the U.S. Patent and Trademark Office, and whose entire contents are hereby incorporated herein by reference.

The present application is further related to U.S. patent application Ser. No. 13/794,402, titled "Fastening Devices for Explosion-Proof Enclosures," which is being filed concurrently with the U.S. Patent and Trademark Office, and whose entire contents are hereby incorporated herein by reference.

The present application is further related to U.S. patent application Ser. No. 13/794,433, titled "Cover Release Mechanisms for Enclosures," which is being filed concurrently with the U.S. Patent and Trademark Office, and whose entire contents are hereby incorporated herein by reference.

The present application is further related to World Intellectual Property Organization (WIPO) Patent Application Serial Number WO2011/084152, titled "Enclosure Clamps and Clamp Systems," filed on Jan. 5, 2010, and whose entire contents are hereby incorporated herein by reference.

TECHNICAL FIELD

The present disclosure relates generally to explosion-proof enclosures and/or flame-proof, and more particularly to systems, methods, and devices for securing a cover of an explosion-proof enclosure to a body of the explosion-proof enclosure.

BACKGROUND

Explosion-proof receptacle housings and enclosure systems are used in many different industrial applications. Such explosion-proof receptacle housing and enclosure systems may be used for example, in military applications, onboard ships, assembly plants, power plants, oil refineries, petrochemical plants, and other harsh environments. At times, the equipment located inside such explosion-proof receptacle housing and enclosure systems is used to control motors and other industrial equipment.

In order for an explosion-proof enclosure to meet certain standards and requirements, the cover of the enclosure must be sealed to the body of the enclosure within certain tolerances. Often, this requires a large number (30 or more) of bolts to be tightened. Consequently, securing all of the bolts at the appropriate torque is a very time-consuming process. In addition, removing all of the bolts to access one or more components inside the explosion-proof enclosure is a time-consuming process.

SUMMARY

In general, in one aspect, the disclosure relates to a system for fastening a cover to a body of an explosion-proof enclosure using a number of fastening devices. Each fastening device can include a fastener that includes a stem having quick release threads, where the stem traverses a first aperture in a flange and a second aperture in an opposing flange. The fastener of each fastening device can also include a head rotatably coupled to the stem, where the head has mating threads for the quick release threads of the stem, and where the head abuts against the opposing flange.

In another aspect, the disclosure can generally relate to a system for fastening a cover to a body of an explosion-proof enclosure. The system can include a flange having a number of first apertures traversing therethrough. The system can also include an opposing, flange that abuts the flange, where the opposing flange has a number of second apertures traversing therethrough. The system can further include a number of fastening devices. Each fastening device can include a fastener receiver disposed on the opposing flange, where the fastener receiver has mating threads. Each fastening, device can also include a fastener having a proximal end and a distal end, where the proximal end abuts the flange, where the fastener traverses a first aperture and a second aperture, where the distal end comprises quick release threads disposed thereon, and where the quick release threads are threadably coupled to the mating threads of the fastener receiver.

In yet another aspect, the disclosure can generally relate to a system for fastening a cover to a body of an explosion-proof enclosure. The system can include a flange having a plurality of slotted apertures traversing therethrough. The system can also include an opposing flange that abuts the flange, where the opposing flange has an anchor receiver. The system can further include a number of fastening devices. Each fastening device can include a stem that moves within a slotted aperture of the slotted apertures, where the stem has a bolt length greater than a flange height. Each fastening device can also include a head mechanically coupled to a distal end of the stem and that abuts against an outer surface of the flange. Each fastening device can further include an anchor movably coupled within the anchor receiver of the opposing, flange and mechanically coupled to a proximal end of the stem.

In still another aspect, the disclosure can generally relate to a system for fastening a cover to a body of an explosion-proof enclosure. The system can include a flange, and an opposing flange that abuts the flange. The system can also include a first load distributing member disposed on the flange, where the first load distributing member has a number of slotted apertures traversing therethrough. The system can further include a second load distributing member disposed on the opposing flange, where the second load has an anchor receiver. The system can also include a number of fastening devices. Each fastening device can include a stem that moves within a slotted aperture of the plurality of slotted apertures, where the stem has a bolt length greater than a flange height, an opposing flange height, and a first load distributing member height. Each fastening device can also include a head mechanically coupled to a distal end of the stem and that abuts against an outer surface of the flange. Each fastening device can further include an anchor disposed within and movably coupled to the anchor receiver of the second load distributing member, where the anchor is also mechanically coupled to a proximal end of the stem.

In yet another aspect, the disclosure can generally relate to a system for fastening a cover to a body of an explosion-proof enclosure using a number of fastening devices. Each fastening, device can include a cam fixture having a cam slot, a first aperture, and a cam feature, where the cam fixture is disposed on a flange of the explosion-proof enclosure. Each fastening device can also include a fastener movably coupled to the cam fixture within the first aperture, where the fastener has a stem, a head, and a base, where the head is mechanically coupled to one end of the stem, where the base is mechanically coupled to an opposite end of the stem, and where the base fits within the cam slot and rotatably couples to the cam fixture. The stem can traverse a second aperture in an opposing flange of the explosion-proof enclosure. The head can abut against the opposing flange.

These and other aspects, objects, features, and embodiments will be apparent from the following description and the appended claims.

BRIEF DESCRIPTION OF THE DRAWINGS

The drawings illustrate only example embodiments of fastening devices for explosion-proof enclosures and are therefore not to be considered limiting of its scope, as fastening devices for explosion-proof enclosures may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical elements.

DETAILED DESCRIPTION OF EXAMPLE EMBODIMENTS

Figure 1A:
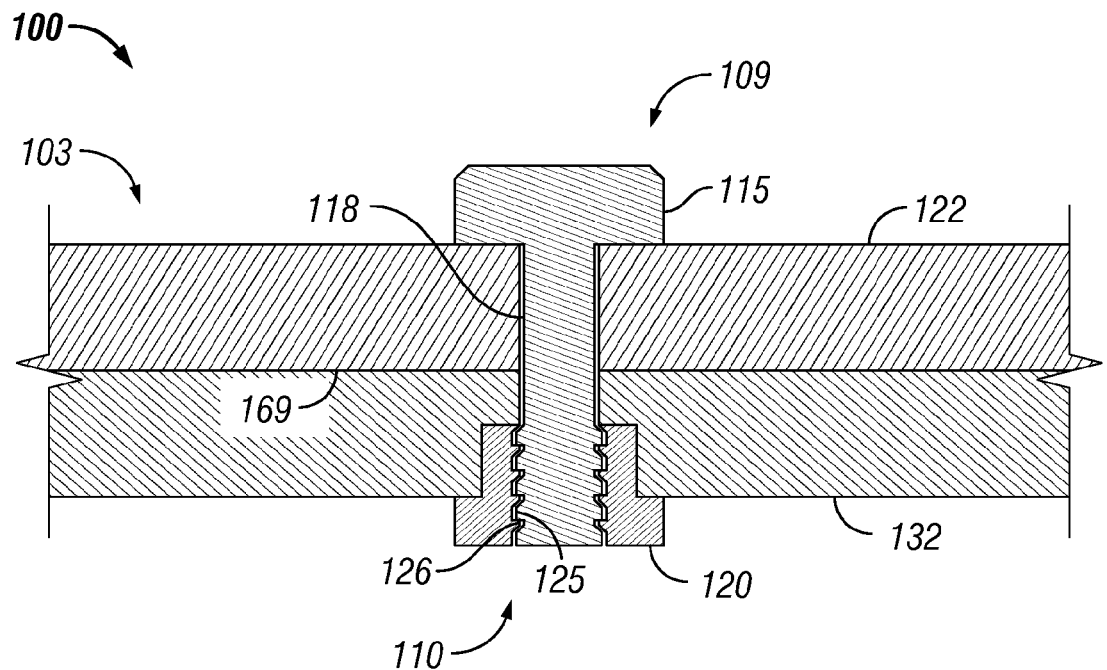
FIGS. 1A and 1B show various views of example fastening devices in accordance with certain example embodiments.

The example embodiments discussed herein are directed to systems, apparatuses, and methods of fastening a cover of an explosion-proof enclosure to a body of the explosion-proof enclosure. While the example embodiments discussed herein are with reference to explosion-proof enclosures, other types if non-explosion-proof enclosures (e.g., junction boxes, control panels lighting panels, motor control centers, switchgear cabinets, relay cabinets) or any other type of enclosure (e.g., a flame-proof enclosure) may be used in conjunction with example embodiments of fastening devices.

In one or more example embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path from inside the explosion-proof enclosure to outside the explosion-proof enclosure, along which one or more gases may travel. A joint may be a mating of any two or more surfaces. Each surface may be any type of surface, including but not limited to a fiat surface, a threaded surface, and a serrated surface.

In one or more example embodiments, an explosion-proof enclosure is subject to meeting certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (UL) (e.g., UL 1203). For example, a Class 1 hazardous area under the National Electric Code is an area in which flammable gases err vapors may be present in the air in sufficient quantities to be explosive.

As a specific example, NEMA standards for an explosion-proof enclosure of a certain size or range of sizes may require that in a Group B, Division I area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

Some standards also require that one or more tools are used to open an explosion-proof enclosure. Example embodiments described herein require the use of a tool, whether custom made or standard, to disengage the fastening device and open the explosion-proof enclosure. Each of the components of the example fastening devices (e.g., fastener, fastener receiver, load distributing member, handle, cam, pin) can be made from one or more of a number of suitable materials, including but not limited to stainless steel, plastic, aluminum, ceramic, rubber, and iron.

Example embodiments of fastening devices for explosion-proof enclosures will be described more fully hereinafter with reference to the accompanying drawings, in which example embodiments of fastening devices for explosion-proof enclosures are shown. Fastening devices for explosion-proof enclosures may, however embodied in many different forms and should not be construed as limited to the example embodiments set forth herein. Rather, these example embodiments are provided so that this disclosure will be thorough and complete, and will fully convey the scope of fastening devices for explosion-proof enclosures to those or ordinary skill in the art. Like, but not necessarily the same, elements (also sometimes called components) in the various figures are denoted by like reference numerals for consistency.

Figure 1B:
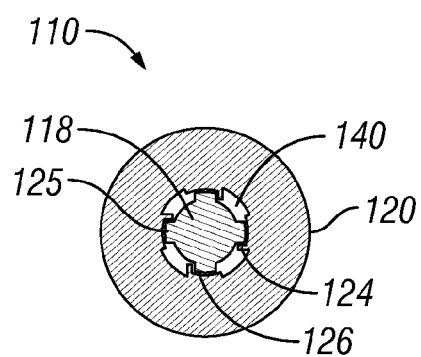

FIGS. 1A and 1B show various views of an enclosure system 100 that uses an example fastening device 110 in accordance with one or more example embodiments. Specifically. FIG. 1A shows a front view of the enclosure system 100. FIG. 1B shows a cross-sectional top view of the example fastening device 110. In one or more embodiments, one or more of the features shown in FIGS. 1A and 1B may be omitted, repeated, and/or substituted. Accordingly, embodiments of fastening devices for explosion-proof enclosures should not be considered limited to the specific arrangements of components shown in FIGS. 1A and 1B.

Referring to FIGS. 1A and 1B, the enclosure system 100 of FIG. 1A includes an explosion-proof enclosure 103 using at least one example fastening device 110 in accordance with certain example embodiments. The explosion-proof enclosure 103 includes an enclosure cover and a cover flange 122 around the perimeter of the enclosure cover. The cover flange 122 is mated to (abuts against) a body flange 132 that is positioned around the perimeter of the enclosure body. The cover flange 122 and the body flange 132 each have a height or thickness, which may be the same or different from each other. In certain embodiments, one or more hinges may be positioned along one side of the enclosure cover and a corresponding side of the enclosure body. When most, if not all, of the example fastening devices 110 are removed, the enclosure cover can be separated from the enclosure body.

As shown in FIG. 1A, the example fastening device 110 is arranged around the perimeter of the cover flange 122 and the body flange 132. The air gap that forms between the surfaces of the cover flange 122 and the body flange 132 when the cover flange 122 and the body flange 132 converge is the flame path 169. One of the functions of the fastening device 110 is to ensure that the flame path 169 is within an accepted tolerance in light of a particular standard for the explosion-proof enclosure 103.

As shown in FIGS. 1A and 1B, the fastening device 110 uses a quick release fastener 109, which includes a head 115 and a threaded stem 118. The head 115 can be shaped and/or configured to accommodate one or more of a number of tools. For example, the head 115, when looking from above, may be shaped like a hexagon. As another example, the head 115 may have a slot that traverses the top surface.

The threads 125 on the threaded stem 118 may be disposed along all or a portion of the surface of the threaded stem 118. In certain example embodiments, the threads 125 on the threaded stem 118 have a substantial thread profile. In other words, the shape and/or pitch of the threads 125 are extreme so that the quick release fastener 109 can be secured to a fastener receiver 120 by rotating the quick release fastener 109 approximately 90°. Such rotation can be clockwise or counterclockwise, depending on whether the threads 125 are left-handed or right handed.

The term "quick release" is meant to generally define fasteners that can take less than one ball turn of travel to reach optimal tension. Such threads on a quick release fastener can be called quick release threads. For example, the quick release fastener can travel 90° to reach the end of the mating thread to which the quick release threads of the quick release fastener are threadably coupled. Alternatively, the quick release fastener can travel any other distance, including but not limited to approximately 45°, 180° and 270°. In certain example embodiments, the quick release fastener can travel more than one turn (greater than 360°).

In addition, or in the alternative, the threads 125 on the threaded stem 118 can be interrupted. In other words, each of the threads 125 on the threaded stem 118 may not continue around the entire perimeter of the threaded stem 118. The threads 125 on the threaded stem 118 can also, or in the alternative, have multiple lead threads triple lead threads, quad lead threads). In certain example, embodiments, the quick release fastener 109 is secured to the fastener receiver 120 by rotating the quick release fastener 109 less than 90°. For example, the quick release fastener 109 can be secured to the fastener receiver 120 by rotating the quick release fastener 109 approximately 45°.

The fastener receiver 120 can be secured to the body flange 132 or the cover flange 122 using an aperture in the body flange 132 or the cover flange 122, where the aperture is shaped to fit the fastener receiver 120 without allowing the fastener receiver 120 to move transversely as the quick release fastener 109 is coupled to the fastener receiver 120. In certain example embodiments, the fastener receiver 120 is integrated with the body flange 132 and/or the cover flange 122, where the mating threads 126 are machined into the body flange 132 and/or the cover flange 122.

If the fastener receiver 120 is a separate component from the body flange 132 and/or the cover flange 122 (i.e., if the fastener receiver 120 is not integrated with the body flange 132 and/or the cover flange 122), the fastener receiver 120 can have a shape that corresponds to a shape of the body flange 132 and/or the cover flange 122 into which the fastener receiver 120 is disposed. Examples of such shapes can include, but are not limited to, a triangle, a square, and a hexagon. Such a shape can be symmetrical, asymmetrical, or random.

In certain example embodiments, the mating threads 126 of the fastener receiver 120 can mate with the threads 125 of the threaded stem 118. In addition, the fastener receiver 120 can have one or more additional features. For example, as shown in FIG. 1B, the fastener receiver 120 can have one or more of a number of stops 124 that prevent the threaded stem 118 from turning beyond a certain angle (e.g., 90°, 45°). In this case, as shown in FIG. 1B, each stop 124 can impede the rotational path of a thread 125 (specifically, the distal portion of the thread 125) of the threaded stem 118. As another example, the fastener receiver 120 can have one or more of a number of passages 140 that provide clearance for insertion and/or extraction of the threaded stem 118 when the mating threads 126 are disengaged from the threads 125 of the threaded stem 118.

In certain example embodiments, the fastener receiver 120 can include a top portion and a bottom portion. As shown in FIG. 1A, the top portion of the fastener receiver 120 can be disposed within a cavity (hidden from view of the fastener receiver 120) of the body flange 132. The top portion of the fastener receiver 120 can have a cross-sectional shape and size that is substantially the same shape and size as a cavity in the body flange 132. In certain example embodiments, the cavity that receives the top portion of the fastener receiver 120 is disposed in the cover flange 122 rather than the body flange 132. In such a case, the orientation of the fastener receiver 120 is inverted from its position shown in FIG. 1A. In some cases, the cavity can completely traverse the base flange 132 (or the cover flange 122) and partially traverse the cover flange 122 (or the base flange 132).

The cavity can be at least as long as the top portion of the fastener receiver 120. For example, as shown in FIG. 1A, the cavity is substantially the same height as the height of the top portion of the fastener receiver 120. The walls of the flange (e.g., the body flange 132, the cover flange 122) that form the cavity can be smooth, textured, and/or have some other feature (e.g., mating threads). Similarly, the outer surface of the top portion of the fastener receiver 120 can have the same and/or different features. As an example, as shown in FIG. 1A, the wall of the body flange 132 that forms the cavity can have mating threads 126 disposed thereon, and the outer surface of the top portion of the fastener receiver 120 can have corresponding mating threads (which can be the same or different than the threads 125) disposed thereon. As another example, the wall of the cover flange 122 can have threads disposed thereon. In such a case, the threaded stem 118 can have complementary mating threads (which can be the same or different than the threads 125) disposed on its outer surface at an end opposite where the threads 125 are disposed. As a result, the head 115 can be an optional feature of the quick release fastener 109.

In certain example embodiments, the bottom portion of the fastener receiver 120 can be wider (flared) compared to the top portion of the fastener receiver 120. In such a case, the flared bottom portion extend laterally away from the top portion of the fastener receiver 120, forming an angle with the top portion. Such an angle can be one or more of a number of angles (e.g., 90°, 120°, 45°). In certain example embodiments, the angle formed by the flared portion of the bottom portion relative to the top portion can be such that the flared portion of the bottom portion of the fastener receiver 120 is substantially parallel to the bottom surface of the body flange 132 (or the top surface of the cover flange 122, as appropriate) when the top portion of the fastener receiver 120 is mechanically coupled to the cavity.

When the fastener receiver 120 is disposed within the cavity, and when the threaded stem 118 is disposed within the aperture that traverses the fastener receiver 120, the head 115 of the fastener 109 can be rotated in a direction (e.g., clockwise) to apply greater compressive force to the fastener receiver 120, the body flange 132, and the cover flange 122. Specifically, when the head 115 is rotated in a certain direction (e.g., clockwise), mating threads 125, 126 make up and pull the fastener receiver 120 upward toward the head 115. Conversely, as the head 115 is rotated in an opposite direction (e.g., counterclockwise), the fastener receiver 120 is pushed away from the head 115.

In certain example embodiments, the head 115 is mechanically coupled to a flange (e.g., the cover flange 122, the body flange 132). The head 115 can be mechanically coupled to a flange in one or more of a number of ways. For example, the head 115 can have threads disposed along its outer surface that threadably couple to corresponding mating threads disposed along the wall that forms the cavity of the flange into which the head 115 is disposed. As another example, the head 115 can be press-fit into a flange. In certain example embodiments, the head 115 becomes fixed in place (at least in one rotational direction) when the head 115 is mechanically coupled to a flange. In such a case, by rotating the fastener receiver 120, the threaded stem 118 is put under tension, closing the flame path 169 and drawing the cover flange 122 and the body flange 132 together.

The fastener receiver 120 can be made of one or more of a number of materials. Examples of such materials can include, but are not limited to, steel, rubber, nylon, and aluminum. In certain example embodiments, when the fastener receiver 120 is mechanically coupled to the fastener 310 and one or both flanges, a flame path 169 between the cover flange 122 and the body flange 132 can meet one or more applicable standards (e.g., the flame path 169 is no greater than 0.0015 inches).

Figure 2A:
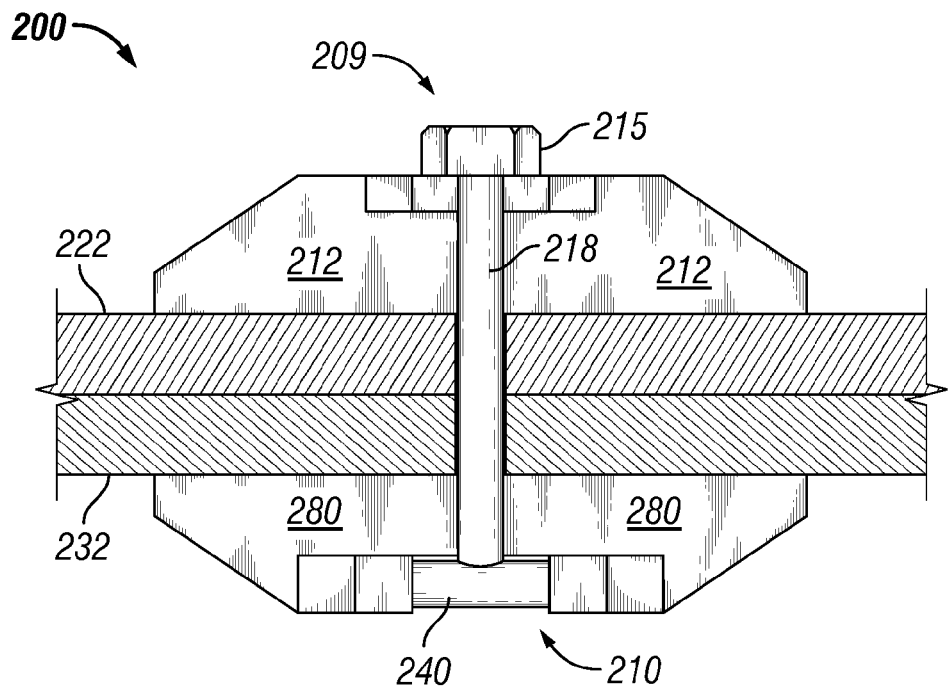
FIGS. 2A-2C show various views of alternative example fastening devices in accordance with certain example embodiments.
Figure 2B:
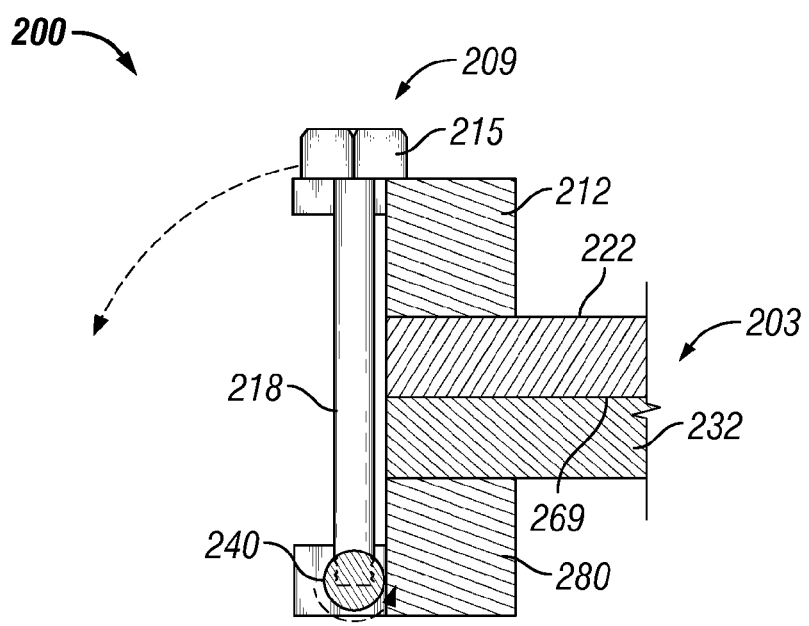
Figure 2C:
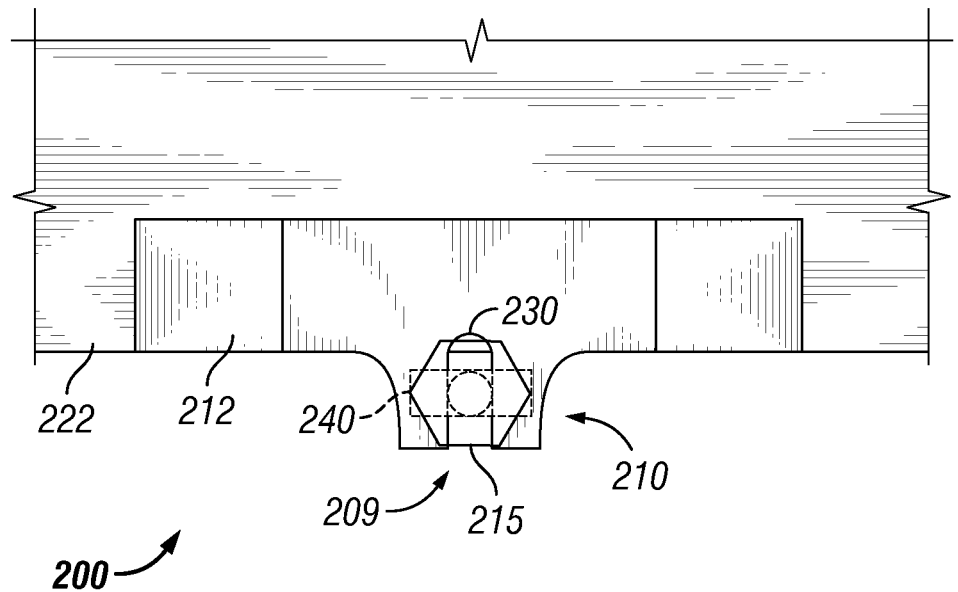

FIGS. 2A-2C show various views of a system 200 that uses yet another example fastening device 210, in accordance with certain example embodiments, to secure the explosion-proof enclosure 203. In one or more embodiments, one or more of the features shown in FIGS. 2A-2C may be omitted, repeated, and/or substituted. Accordingly, embodiments of fastening devices for explosion-proof enclosures should not be considered limited to the specific arrangements of components shown in FIGS. 2A-2C.

Referring to FIGS. 1A-2C, FIGS. 2A-2C show an example fastening device 210. In this case, the example fastening device 210 includes a bolt 209 having a head 215 that is fixedly coupled to a stem 218. The fastening device 210 can also include an anchor 240 that is movably (e.g., rotatably) coupled to the load distributing member 280 and the stem 218. In such a case, the load distributing member 280 can include an anchor receiver into which the anchor 240 can be movably disposed.

In certain example embodiments, the load distributing member 280 is not included, in which case the anchor 240 can be movably coupled to an anchor receiver disposed within the body flange 232 (or the cover flange 222 if the fastening device 210 is inverted relative to what is shown in FIG. 2A-2C). As another alternative, if the load distributing member 212 is included and if the fastening device 210 is inverted, the load distributing member 212 can include an anchor receiver, and the anchor 240 can be movably disposed within the anchor receiver of the load distributing member 212.

In certain example embodiments, the stem 218 is fixedly coupled (rather than moveably coupled) to the anchor 240 and movably (e.g., rotatably) coupled to the head 215. In such a case, the anchor 240 remains rotatably coupled to the load distributing member 280, and the head 215 can be include mating threads or some other coupling feature. The threads on the stem 218 can have a standard threading, a multiple lead threading, or some other suitable threading. For example, the threads on the stem 218 can be threads of an example quick release fastener. The head 215 can be a threaded nut.

Optionally, the fastening device 210 can also include one or more other components. For example, as shown in FIG. 2A, the fastening device can include load distributing member 212 and load distributing member 280. The optional load distributing member 212 cam be mechanically coupled to (disposed on) the top surface of the cover flange 122, and/or the optional load distributing member 280 can be mechanically coupled to (disposed on) the bottom surface of the base flange 132. Alternatively, the load distributing member 212 can be mechanically coupled to (disposed on) the bottom surface of the base flange 132, and the optional load distributing member 280 can be mechanically coupled to (disposed on) the top surface of the cover flange 122. In certain example embodiments, each load distributing member distributes the three applied to the top center portion of the load distributing member toward the sides of the load distributing member to apply a substantially even distribution of the force along the length of the load distributing member.

Each load distributing member has a shape (e.g., length, width, pitch, height) that allows for a substantially even distribution of force along the length of the load distributing member when the force is applied to the top center portion of the load distributing member. The load distributing members can be mechanically coupled to the cover flange 122 and the base flange 132, as appropriate, using one or more of a number of coupling methods. Such coupling methods can include, but are not limited to, epoxy, fastening devices, compressive fittings, and slotted fittings.

In certain example embodiments, the bolt 209 swings through a slotted aperture 230 (a U-channel) in, at least, the load distributing member 212 and the load distributing member 280. If the load distributing member 212 and the load distributing member 280 do not extend beyond the cover flange 122 and the body flange 132, or if the load distributing member 212 and the load distributing member 280 are not included in the system 200, then the slotted aperture 230 can be positioned in the cover flange 122 and the body flange 132.

As the head 215 (whether independently or as part of the bolt 209) is rotated in a direction (e.g., clockwise), the fastening device 210 tightens and applies additional pressure to compress (apply a compressive force to) the load distributing member 212, the cover flange 122, the body flange 132, and the load distributing member 280. Conversely, as the head 215 (whether independently or as part of the bolt 209) is rotated in an opposite direction (e.g., counterclockwise), the fastening device 210 loosens and removes pressure to compress (removes a compressive force to) the load distributing member 212, the cover flange 122, the body flange 132, and the load distributing member 280.

Figure 3:
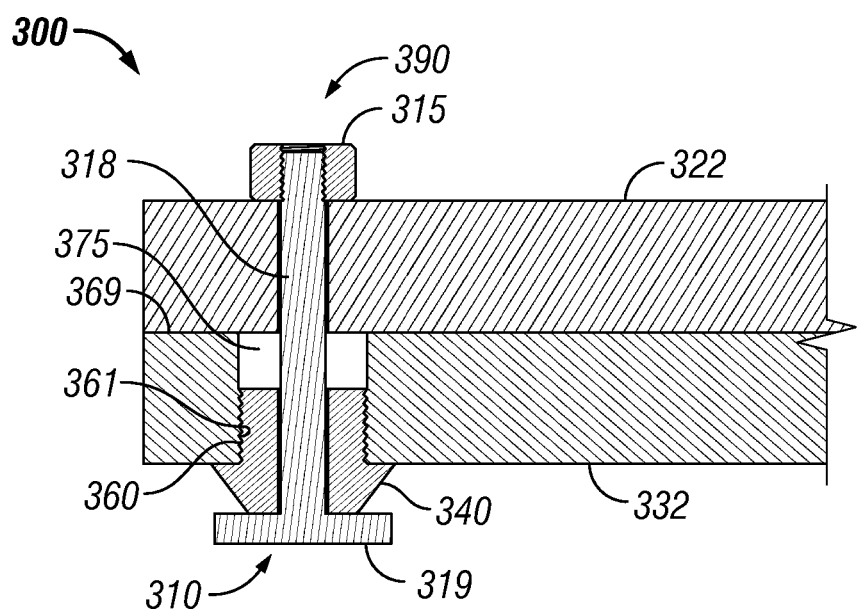
FIG. 3 shows another alternative example fastening device in accordance with certain example embodiments.

FIG. 3 shows a cross-sectional side view of another example fastening device 390 is used in accordance with certain example embodiments. In one or more embodiments, one or more of the features shown in FIG. 3 may be omitted, repeated, and/or substituted. Accordingly, embodiments of fastening devices should not be considered limited to the specific arrangements of components shown in FIG. 3.

Referring to FIGS. 1-3, FIG. 3 shows a cross-sectional side view of a system 300 that includes an example fastening device 390 to secure an explosion-proof enclosure 103. In certain example embodiments, the fastening device 390 can include a fastener 310 and a fastener receiver 340. The fastener 310 can include one or more of a number of components. Once such component can be a stem 318. The stem 318 can have a smooth outer surface. Alternatively, or in addition, the stem 318 can have one or more features disposed on its outer surface. For example, the outer surface of the stem 318 can have a quick release mating thread (similar to the quick release fastener 109 described above with respect to FIG. 1) disposed along part of its outer surface.

The fastener 310 can also include a head 315 that is disposed at one end of the stem 318 and abuts a flange (e.g., cover flange 322, body flange 332). The head 315 can be a threaded nut. The head 315 can be shaped and/or configured to accommodate one or more of a number of tools, which can be used to hold in place and/or move (e.g., rotate) the head 315. For example, the head 315, when looking from above, may be shaped like a hexagon (as for receiving a socket or a wrench). As another example, the head 315 may have a slot (as for receiving a screwdriver) that traverses the top surface. As another example, the head 315 can include a protrusion from which two slotted wings extend laterally in opposite directions, as with a wing nut.

In certain example embodiments, if the head 315 is removably coupled to the stem 318 by quick release mating threads, the head 315 and/or the stem 318 can have a stop, as defined above with respect to FIGS. 1A and 1B, that prevent the head 315 and the stem 318 from turning beyond a certain angle (e.g., 90°, 45°) relative to each other. In addition, or in the alternative, the head 315 and/or the stem 318 can have one or more of a number of passages, as defined above with respect to FIGS. 1A and 1B, that provide clearance for insertion and/or extraction of the head 315 relative to the stem 318 when the mating threads are disengaged from each other.

Optionally, the fastener 310 can also include a base 319. In certain example embodiments, at the end of the stem 318 opposite of where the head 315 is disposed, the base 319 is disposed on the stem 318. The base 319 can be used to secure (e.g. abuts against) a bottom portion of the fastener receiver 340, described below. If there is no fastener receiver 340, then the base 319 can be used to secure a surface of a flange (e.g., the top surface of the cover flange 322, a bottom surface of the base flange 332). The base 319 can extend laterally away from the stem 318 at some angle (e.g., 90°, 120°, 45°). The base 319 can have any of a number of shapes, including but not limited to a circle, a line, a bar, and a rectangle. The base 319 can extend laterally away from the stem 318 symmetrically or asymmetrically.

If there is no base 319, the end of the stem 318 opposite of where the head 315 is disposed can include one or more of a number of features (e.g., a slot, a hexagonal shape) that allows the stem 318 to be rotated, using a tool, so that the stem 318 can be threadably coupled to the head 315. If there is an base 319, the base 319 can have one or more of such features.

The base 319, the head 315, and the stem 318 can be made as a single piece (as from a mold) and/or can be separate pieces that are mechanically coupled to each other in any of a number of coupling methods, including but not limited to welding, compression fittings, mating threads, and slotted fittings. For example, the base 319 and the stem 318 can be a single piece that forms a "T", while the head 315 is movably (e.g., threadably) coupled to the stem 318. In certain example embodiments, at least one of the base 319 and the head 315 is movably coupled to the stem 318. Examples of movable coupling methods can include, but are not limited to, mating threads, slotted fittings, and a pin removably inserted into the stem 318. If mating threads are used, the mating threads can be any of a number of standard mating threads making multiple rotations. Alternatively, the mating threads can be quick release threads, as described above with respect to FIGS. 2A-2C.

In certain example embodiments, the fastener receiver 340 receives part of the fastener 310 and is used to secure part of the enclosure. The fastener receiver 340 can have one or more features that are used to receive the fastener 310. An example of such a feature can be an aperture that traverses at least part of the fastener receiver 340. For example, as shown in FIG. 3, an aperture (hidden from view by the stem 318) can traverse the entire height of the fastener receiver 340 at the approximate radial center of the fastener receiver 340. In such a case, the aperture that traverses the fastener receiver 340 is substantially the same shape and size (cross-sectionally) as the cross-sectional shape and size of the stem 318.

In addition, the cross-sectional shape and size of the aperture that traverses the fastener receiver 340 can be substantially the same as the shape and size of an aperture that traverses an opposing flange (e.g., the cover flange 322), where the opposing flange is different than the flange having the cavity 375, described below. The inner surface of the fastener receiver 340 that forms the aperture can be smooth, textured, and/or have some other feature (e.g., mating threads). The inner surface of the fastener receiver 340 that forms the aperture can have the same and/or different features.

The fastener receiver 340 can also have one or more features that can be used to mechanically couple to the body flange 332 and/or the cover flange 322. For example, as shown in FIG. 3, the top portion of the fastener receiver 340 can have a cross-sectional shape and size that is substantially the same shape and size as a cavity 375 in the body flange 332. In certain example embodiments, the cavity that receives the top portion of the fastener receiver 340 is disposed in the cover flange 322, rather than the body flange 332. In such a case, the orientation of the fastener receiver 340 is inverted from its position shown in FIG. 3. In some cases, the cavity 375 can completely traverse the base flange 332 (or the cover flange 322) and partially traverse the cover flange 322 or the base flange 332). Alternatively, the fastener receiver 340 can be part of a single piece (as from a mold) with the flange (e.g., base flange 332) on which the fastener receiver 340 is disposed.

The cavity 375 can be at least as long as the top portion of the fastener receiver 340. For example, as shown in FIG. 3, the cavity 375 is longer (extends further upward into the body flange 332) than the top portion of the fastener receiver 340. The walls of the flange (e.g., the body flange 332, the cover flange 322) that form the cavity 375 can be smooth, textured, and/or have some other feature (e.g., mating threads). Similarly, the outer surface of the top portion of the fastener receiver 340 can have the same and/or different features. As an example, as shown in FIG. 3, the wall of the body flange 332 that forms the cavity 375 can have mating threads 360 disposed thereon, and the outer surface of the top portion of the fastener receiver 340 can have corresponding mating threads 361 disposed thereon.

An example of another feature of the fastener receiver 340 that can be used to mechanically couple the fastener receiver 340 to the body flange 332 and/or the cover flange 322 is a flared bottom portion. In such a case, as shown in FIG. 3, the flared portion of the bottom portion extend laterally away from the top portion of the fastener receiver 340, forming an angle with the top portion. Such an angle can be one or more of a number of angles (e.g., 90°, 120°, 45°). In certain example embodiments, the angle formed by the flared portion of the bottom portion relative to the top portion can be such that the flared portion of the bottom portion of the fastener receiver 340 is substantially parallel to the bottom surface of the body flange 332 (or the top surface of the cover flange 322, as appropriate) when the top portion of the fastener receiver 340 is mechanically coupled to the cavity 375.

When the fastener receiver 340 is disposed within the cavity 375, and when the fastener 310 is disposed within the aperture that traverses the fastener receiver 340, the base 319 and/or the head 345 can be adjusted relative to the stem 318 to apply greater compressive force to the fastener receiver 340, the body flange 332, and the cover flange 322. For example, the head 315 can be a threaded nut that is threadably coupled to an upper portion of the stem 318. When the head 315 is rotated in a certain direction (e.g., clockwise), the base 319 is pulled toward the head 315. Conversely, as the head 315 is rotated in an opposite direction (e.g., counterclockwise), the base 319 is pushed away from the head 315.

As a specific example, consider a case where the base 319 and the stem 318 are a single piece that forms a "T", while the head 315 is threadably coupled, using quick release mating threads, to the stem 318. In such a case, the base 319 abuts against the fastener receiver 340, and the stem 318 traverses the aperture that extends through the fastener receiver 340. The adjacent surface on the fastener receiver 340 can have a cam profile, so that as the combination of the stem 318 and the base 319 is rotated and threadably coupled to the head 315, the stem 318 is put in tension. Consequently, the cover flange 322 and the body flange 332 are drawn together, and the flame path 369 is closed. Based on the cam profile of the fastener receiver 340, the quick release mating threads can be, for example, ¼ turn or $1/10^{th}$ turn based on the elongation required for appropriate tension of the stem 318.

As another example, the fastener receiver 340 can be a cam fixture, similar to the cam fixture described in U.S. patent application Ser. No. 13/793,672, titled "Fastening Devices for Explosion-Proof Enclosures," which is being filed concurrently with the U.S. Patent and Trademark Office, and whose entire contents are hereby incorporated herein by reference. For example, the fastener receiver 340 can include a clearance slot, a cam feature, and an aperture (hidden from view by the stem 318).

In such a case, the clearance slot of the fastener receiver 340 can receive the base 319 of the fastener 310 when the fastener 310 has been inserted into the aperture of the fastener receiver 340. The aperture of the fastener receiver 340 can align with and have substantially the same size and shape as an aperture that traverses the opposing flange (e.g., the cover flange 322) from the flange (e.g., the base flange 332) into which the fastener receiver 340 is disposed. The shape and size of the clearance slot of the fastener receiver 340 relative to the base 319 allow only a limited number of orientations for the base 319 to fit within the clearance slot. Such an alignment can coincide with coupling features (e.g., quick release threads) disposed on the distal end of the stem 318, as well as the head 315.

Once the base 319 is lit within the clearance slot of the fastener receiver 340, the base 319 (and, thus, the rest of the fastener 310) can be rotated along the cam feature until the base 319 reaches the end of the cam feature. In certain example embodiments, the slope and distance (e.g., amount of rotation) of the cam feature can coincide with the slope and distance of the coupling features at the distal end of the stem 318.

Alternatively, if the stem 318 is fixedly coupled to the head 315, the slope and distance of the cam feature can coincide with the optimal tension of the stem 318 when the base 319 has been fully rotated within the cam feature. In such a case, the base 319 can be removably coupled to the stem 318. For example, the base 319 can be a pin that removably couples (e.g., slides, threadably couples) to as receiving aperture at the end of the stem 318.

When the base 319 of the fastening device movably (e.g., rotatably) travels to the end of the cam feature, the stem 318 of the fastener 310 is at an optimal tension. Such optimal tension of the stem 318 can also, or in the alternative, be a result of the distal end of the stem 318 movably (e.g., rotatably, threadably) coupling to a coupling feature disposed in the head 315. In any case, as a result, cover flange 322 and the base flange 332 are forced toward each other and to close the distance of the flame path 369.

The fastener receiver 340 can be made of one or more of a number of materials. Examples of such materials can include, but are not limited to, steel, rubber, nylon, and aluminum. In certain example embodiments, when the fastener receiver 340 is mechanically coupled to the fastener 310 and one or both flanges, a flame path 369 between the cover flange 322 and the body flange 332 can meet one or more applicable standards (e.g., flame path 369 is no greater than 0.0015 inches).

In certain example embodiments, the fastening device 390 of FIG. 3 and the fastening device 110 of FIGS. 1A and 1B can be used with one or more example load distributing members, as described above with respect to FIGS. 2A-2C. In such a case, fewer fastening devices can be used around the perimeter of the explosion-proof enclosure and still maintain the flame path for the enclosure.

Example embodiments of fastening devices for explosion-proof enclosures resist explosion and/or hydrostatic forces by maintaining a flame path where the cover flange and the body flange are coupled. Further, using the fastening devices described herein and other embodiments of these fastening devices allows for efficient and effective coupling and/or decoupling of the cover and the body of the explosion-proof enclosure. In addition, using example embodiments of fastening devices allows for increased flexibility with regard to where components are positioned on the cover and/or where conduit can be manually coupled to the explosion-proof enclosure. Further, using example embodiments of fastening devices for explosion-proof enclosures allows the flame path to exist within the requirements of one or more standards for explosion-proof enclosures.

Accordingly, many modifications and other embodiments set forth herein will come to mind to one skilled in the art to which fastening devices for explosion-proof enclosures pertain having the benefit of the teachings presented in the foregoing descriptions and the associated drawings. Therefore, it is to be understood that fastening devices for explosion-proof enclosures is not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for fastening a cover to a body of an enclosure, comprising:
   a flange comprising a plurality of first apertures traversing therethrough;
   an opposing flange that abuts the flange, wherein the opposing flange comprises a plurality of second apertures traversing therethrough; and a plurality of fastening devices, wherein each fastening device of the plurality of fastening devices comprises:
  a fastener receiver disposed on the opposing flange, wherein the fastener receiver comprises mating threads; and
  a fastener comprising a proximal end and a distal end, wherein the proximal end abuts the flange, wherein the fastener traverses a first aperture of the plurality of first apertures and a second aperture of the plurality of second apertures, wherein the distal end comprises quick release threads disposed thereon, and wherein the quick release threads are threadably coupled to the mating threads of the fastener receiver, wherein the quick release threads travel less than one full turn to reach the end of the mating threads.

2. The system of claim 1, wherein the fastener receiver comprises at least one stop that prevents the fastener from rotating beyond an angle, wherein the angle is 90°.

3. The system of claim 1, wherein the fastener receiver comprises a top portion that is disposed within a cavity of the opposing flange, wherein the opposing flange comprises an opposing flange wall forming the cavity.

4. The system of claim 3, wherein the top portion of the fastener receiver comprises an outer surface on which a first fastening feature is disposed, and wherein the opposing flange wall forming the cavity comprises a second fastening feature that complements the first fastening feature.

5. The system of claim 3, wherein the cavity of the opposing flange has a depth that is less than a thickness of the opposing flange.

6. The system of claim 1, wherein the enclosure is an explosion-proof enclosure.

7. The system of claim 6, wherein the flange and the opposing flange form a flame path therebetween.

8. The system of claim 7, wherein the flame path is maintained by the plurality of fastening devices.

9. A system for fastening a cover to a body of an enclosure using a plurality of fastening devices, wherein each fastening device of the plurality of fastening devices comprises:
  a head that abuts a flange of the enclosure; and
  a stem fixedly coupled to the head, wherein the stem comprises quick release threads, wherein the stem traverses a first aperture in the flange and a second aperture in an opposing flange of the enclosure,
  wherein the quick release threads travel less than one full turn to reach an end of mating threads to which the quick release threads are threadably coupled.

10. The system of claim 9, wherein each fastening device of the plurality of fastening devices further comprises:
  a fastener receiver mechanically coupled to the opposing flange of the enclosure, wherein the fastener receiver comprises a top portion, a bottom portion, and a third aperture that traverses the fastener receiver along a center of the top portion and the bottom portion of the fastener receiver, wherein the mating threads are disposed on a wall of the third aperture, wherein the stem traverses the third aperture of the fastener receiver.

11. The system of claim 10, wherein the fastener receiver comprises at least one stop that prevents the fastener from rotating beyond an angle, wherein the angle is less than 360°.

12. The system of claim 10, wherein the top portion of the fastener receiver is disposed within the first aperture of the flange, wherein the flange comprises a flange wall forming the first aperture.

13. The system of claim 12, wherein the top portion of the fastener receiver comprises an outer surface on which a first fastening feature is disposed, and wherein the flange wall forming the first aperture comprises a second fastening feature that complements the first fastening feature.

14. The system of claim 10, wherein the fastener receiver is a cam fixture into which a base of the fastener is movably coupled to put the stem under tension, wherein the base is mechanically coupled to the stem.

15. The system of claim 9, wherein the first aperture traverses the entire thickness of the flange.

16. The system of claim 9, wherein the top portion of the fastener receiver is disposed within a portion of the first aperture.

17. The system of claim 9, wherein the flange is a body flange of the body, and wherein the opposing flange is a cover flange of the cover.

18. The system of claim 9, further comprising:
  a first load distributing member disposed between the opposing flange and the head; and
  a second load distributing member disposed on the flange.

19. The system of claim 9, wherein the enclosure is an explosion-proof enclosure, wherein the flange and the opposing flange form a flame path therebetween.

20. The system of claim 19, wherein the flame path is maintained by the plurality of fastening devices.

21. A fastening device comprising:
  a head configured to abut against a flange of a first portion of an enclosure; and
  a stem fixedly coupled to the head, wherein the stem comprises quick release threads, wherein the stem is configured to traverse a first aperture in the flange and a second aperture in an opposing flange of a second portion of the enclosure,
  wherein the quick release threads travel less than one full turn to reach an end of mating threads to which the quick release threads are threadably coupled.

22. The fastening device of claim 21, further comprising:
  a fastener receiver configured to mechanically couple to the opposing flange of the enclosure, wherein the fastener receiver comprises a top portion, a bottom portion, and a third aperture that traverses the fastener receiver along a center of the top portion and the bottom portion of the fastener receiver, wherein the mating threads are disposed on a wall of the third aperture, wherein the quick release threads of the stem mechanically couples to the mating threads of the fastener receiver.

* * * * *